March 26, 1929.　　A. E. LINENDOLL　　1,706,700

CUT-OUT VALVE

Filed Aug. 4, 1924

INVENTOR
Asa E. Linendoll
BY Frank D. Gray
ATTORNEY

Patented Mar. 26, 1929.

1,706,700

UNITED STATES PATENT OFFICE.

ASA E. LINENDOLL, OF NORWALK, OHIO.

CUT-OUT VALVE.

Application filed August 4, 1924. Serial No. 729,908.

This invention relates to cut-out valves intended to be used to divert the exhaust gases from an automobile engine into a pipe leading to a radiator for heating the car.

By my improvement I am able to manufacture a standard cut-out valve to be used in fitting exhaust pipes of various sizes to accommodate different makes of automobiles, and at the same time to make a certain and accurate fit of the valve upon the valve seat to prevent leaking of exhaust gases about the valve, as well as at the connection between the cut-out and the exhaust pipe, to further render the connection between the usual elbow connected with the heater pipe and the opening in the exhaust pipe, leak-proof and positive.

It is an object of my invention to provide such elbow with longitudinal projecting flanges to which the flexible attaching plate may be secured by screws or rivets and further making possible the provision of a slight rib on the elbow or other casting adjacent the opening therein to prevent the gas escaping around the edges of the valve seat.

It is a further object of my improvement to provide bosses at the corners of the elbow opening upon the casting to accurately position the casting upon the exhaust pipe and thus make certain the proper sizes of the pipe opening to make possible the required movement of the valve.

It is a still further object of my invention to connect the valve tongue to the valve lever for actuating it by welding the former to the latter, and to do such welding while the parts are in situ, that is after seating the valve tongue in perfect registration upon the valve seat, so that the accurate seating of the valve may not depend entirely upon the accuracy of the machine work, thus further providing for a leak-proof condition about the valve.

With these and other objects in view I have described my structure hereinafter, recited it in the appended claims and illustrated it in the accompanying drawings in which—

Figure 1:
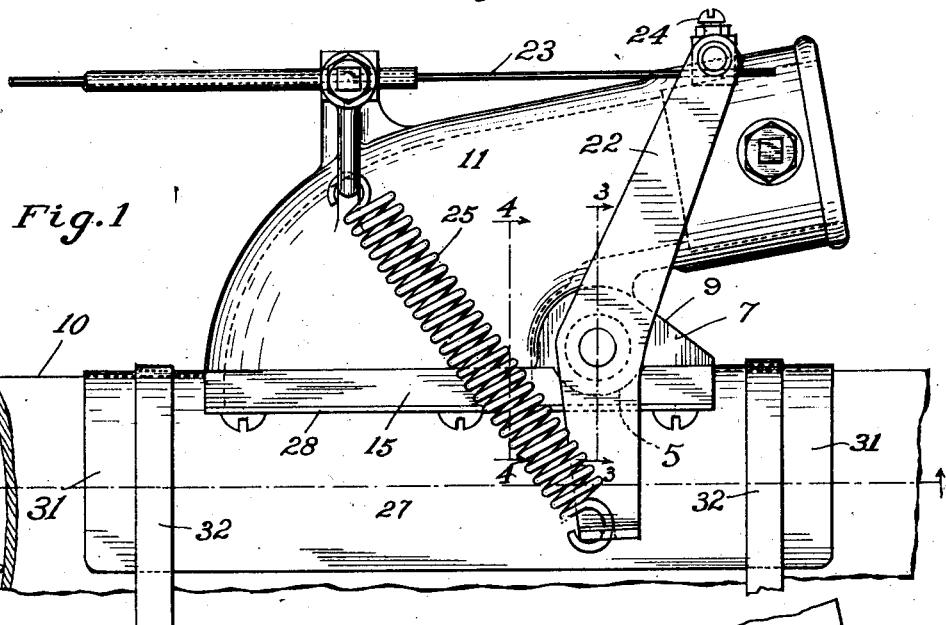
Figure 1 is a side elevation of my invention.

My invention is intended to be used with various automobile heaters designed to be heated by exhaust gases to be diverted from the main exhaust pipe from the engine.

A portion of an exhaust pipe 10 is shown in the drawings, from which an elongated section has been cut forming an opening 13 having parallel lateral edges and curved end edges. In this opening I propose to seat one end of an open-ended casing, such as an elbow 11 the bore of whose elongated opening 14 shall register with that of the opening 13. The lower end 12 of the elbow 11 is provided with horizontal side flanges or wings 15 cast integral therewith. Forwardly, these flanges extend just flush with the wall of the elbow, while at the rear they project sufficiently to form by uniting, an outer wall 9 extending upwardly and forwardly to unite with the main wall of the elbow at 8, thereby forming parallel side walls 7 integral with the wall 9.

Figure 2:
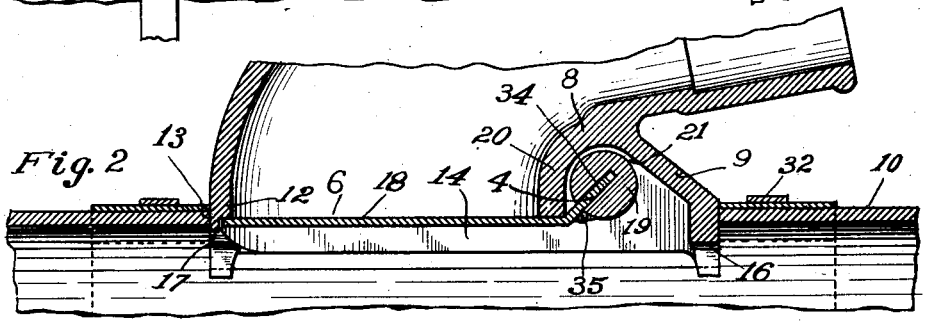
Figure 2 is a longitudinal section of the same taken on the line 2—2 of Fig. 5.
Figure 5:
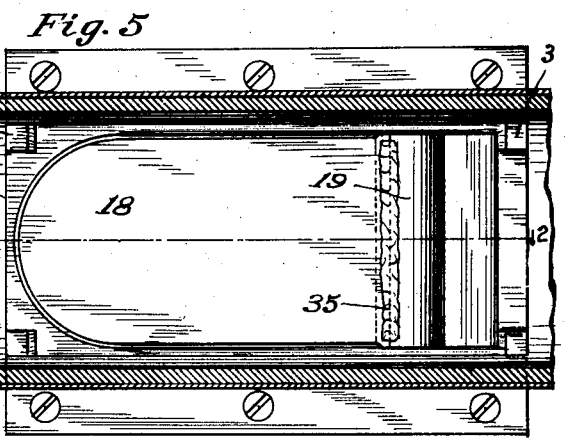
Figure 5 is a horizontal section taken on the line 5—5 of Fig. 1.
Figure 3:
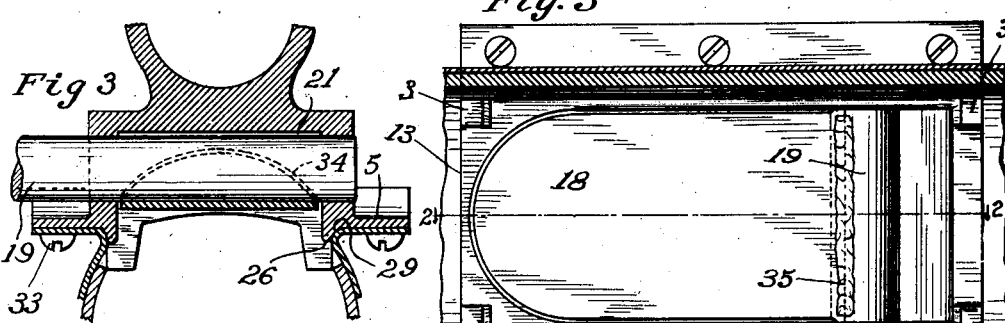
Figure 3 is a detail section taken on the line 3—3 of Fig. 1, the actuating lever being omitted.
Figure 4:
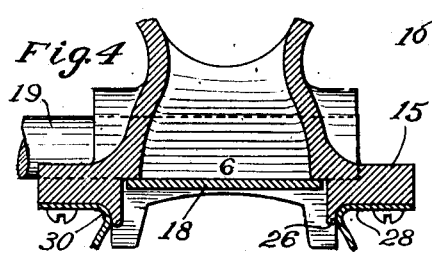
Figure 4 is a detail section taken on the line 4—4 of Fig. 1.

The opening 14 is restricted rearwardly by an over-hanging integral flange or lip 20 curved to conform to the shaft 19 about which it extends for an arc of about 90° within the elbow, to outline a smaller opening 6 into the elbow, this opening constituting the valve seat. The valve 18 closes this seat, corresponds thereto, and is pivoted at its rear end upon the shaft 19. The end of the opening 6 nearest the engine is rounded, and the edges slightly rabbeted or beveled. The rear end 16 of the base of the elbow is integral with the main elbow casting and with the lip 20. In my construction, the rock shaft 19 is journaled in bearings in the side-walls of the elbow and is positioned in the groove or trough 21 formed between parts 16 and 20, and the latter extends down to the horizontal plane through the lower edge of the shaft or even lower, thus the axis of the shaft will be much higher than the lower edge of the lip 20. In fact, it is my purpose to seat the valve and its pivotal axis well up in the elongated opening of the elbow, as shown in Figs. 2, 3 and 4, so that it will be well protected from the gases rushing through the exhaust pipe, except when the valve is open.

The shaft 19 is mounted above and over the flanges 15, the latter being depressed at 5 to receive it, and one end is made polygonal or otherwise shaped to detachably lock the lever 22 thereon for actuating the shaft and valve. The usual connections 23 and 24 are provided, and the expansion spring 25 connects the lower end of the lever with a fixed part to normally close the valve.

In casting the horizontal wings 15 which it is to be noted, are imperforate laterally of the base of the elbow, I further provide longitudinal ribs 26 which extend downward from the inner surface of the flanges closely adjacent the edge of the opening for a purpose explained later. I also provide a flexible metal plate 27 for attaching the elbow to the exhaust pipe with their openings in registration. This plate is preferably rectangular in shape, and has an elongated opening for receiving therein the elongated end of the elbow. Transverse cuts are made in the plate which are connected between their ends by a longitudinal cut whereby lips or flanges 28 are produced which are bent outward and laterally to a horizontal position for convenient attachment to the under surface of the flanges 15, as shown clearly in Figs. 3 and 4. Screws or rivets 33 may be used for readily securing the elbow to the plate. These lips 28 are imperforate, save for the openings to receive the parts 33 which latter fill these attachment openings.

The construction above described is very effective in preventing leakage of gases between the sheet 27 and the pipe 10, for the flanges 28 may be very securely fastened to the underside of the flanges 15 and both flanges 28 and 15 are positively beneath the rock shaft 19 so that the latter does not pass through either of the flanges 28 or through flanges 15, while the provision of the beads or ribs 26 results in grooves 29 adjacent the beads into which the sharp bends 30 of the metal 27 may be fitted very accurately, so that it is highly improbable that gases escaping from the valve will pass around the beads and out between the contacting flanges. The metal plate 27 is flexible and can therefore be bent to fit tightly exhaust pipes of different sizes, and in any case the ends 31 are clamped upon the pipe by conventional metal bands 32 which may be tightened by bolts or other suitable fastenings, as usual.

The shaft 19 is slotted radially at 34 to receive therein the rear end 4 of the valve tongue 18 to provide for actuating the latter. A great difficulty has been encountered in the past in seating the said valve tongue accurately upon the valve seat 6, it being difficult to so mount the valve and the shaft as to accurately register therewith and make a perfect fit. Of course, if the shaft is mounted slightly too high or too low, and the valve tongue is fastened thereto, the tongue 18 will either be too high at the heel with the point thereof separated from the forward edge of the valve seat, or the latter will strike the seat too soon and leave the heel of the tongue slightly spaced from the lip 20, and thus result in leakage from the valve. For this reason, in order to secure great accuracy in seating the valve, I propose to mount the shaft in its bearings before attaching the valve tongue, to the shaft then accurately seat the valve tongue having a bent end on its valve seat loosely, so that the bent end will fit into the rather large slot 34 in the shaft, and then secure the valve to the shaft by welding at 35, in situ. This results in a very accurate and close fitting valve enabling the tongue 18 to strike both parts 12 and 20 squarely at the same time, a great desideratum.

It is to be especially noted that the above conditions can not be obtained unless the shaft 19 is mounted rather higher than has heretofore been thought essential, and that this insertion of the bent end 35 of the tongue 18 into the longitudinal slot 34 of the shaft 19 renders a very secure fastening of the parts, as well as a very accurate and substantially leak-proof valve. Such construction also provides a very positive actuation of the valve tongue by rocking the shaft, as will be evident. This welding of the tongue to the rock shaft after mounting the parts in proper position permits a certain margin in doing the machine work. In former valve structures, the accurate seating of the valve depended entirely upon the accuracy of the machine work. If the valve seat was slightly out of line with the axis of the shaft, or if the bearings for the shaft were slightly higher or lower than the plans provided for, the valve would leak for the shaft and valve tongue being secured together before mounting the two in the casting, the shaft would carry the tongue rigidly with it whether the tongue contacted with the valve seat squarely or not, but in my construction and method a slight inaccuracy in the relation of the parts is provided for by fitting the tongue loosely in its slot while the parts are in position, and subsequently welding together in situ.

I have further provided for accurate fitting of the elbow upon the exhaust pipe by providing the corners about the opening 14 in the elbow with bosses 3 for providing an accurate registration of the openings 13 and 14. These bosses will indicate at once in assembling the parts whether the elongated opening in the pipe 10 is of proper size, so that the elbow may not only be seated in the opening 13 but also in the opening in the plate 27 and thereby insure a tight fit between the elbow and plate. This will therefore insure proper sealing of the gases within the exhaust pipe when the valve is closed.

The usual means for actuating the lever 22 and the shaft 19 with its valve is provided for, the flexible wire 23 leading forwardly by means of which the shaft may be rocked and the valve opened or closed. A further advantage arises from the mounting of the shaft 19 far above the flanges 28 so that the shaft 19 does not perforate the sheet 27 at any point whatever, thus avoiding a former disadvantage of the loose rocking of the shaft in a flexible attaching sheet and permitting escape of gases through the apertures.

It is understood that difficulty has been experienced in the past in making a leak-proof connection between a branch pipe and an apertured exhaust pipe, at the same time providing a valve fitting accurately upon its seat, without incurring additional expense in machining. I do not claim the provision of a flexible plate intermediate the elbow and pipe, nor do I claim the disclosed means for actuating the shaft, but what I do claim and desire to secure by Letters Patent is,—

1. A cut-out valve comprising a pipe having an opening therein, a hollow open-ended casing having an opening at one end within which is a valve seat through which the bore of said casing communicates with the bore of said pipe, flanges projecting laterally and horizontally from the lower edges of said casing, a flexible plate of sheet metal having an opening therein the longitudinal edges of which are flanged outwardly and laterally and secured to the under surface of said casing flanges, a valve for accurately fitting said valve seat, actuating means for said valve mounted in the walls of the casing above the flanges of both casing and plate, and means for securing said plate to said pipe.

2. A cut-out valve comprising a pipe having a longitudinally elongated opening therein, an elbow having an opening at one end within which is a valve seat through which the bore of said elbow communicates with the bore of said pipe, flanges projecting outwardly and laterally from the lower edges of said elbow, a flexible plate of sheet metal having an opening therein the longitudinal edges of which are flanged outwardly and laterally, are imperforate, and are secured to the under surface of said elbow flanges, a valve having its rear end bent transversely and pivotally mounted at the rear end of said valve seat, and means for securing said plate to said pipe.

3. A cut-out valve comprising a pipe having an opening therein, an elbow having an opening at one end within which is a valve seat through which the bore of said elbow communicates with the bore of said pipe and provided with bosses at the corners of said end for positioning the elbow accurately in said pipe opening, a valve having its rear end bent transversely of its length, said bent end being pivotally mounted at the rear end of and beyond said valve seat, and means for securing said elbow to said pipe with the edges of the elbow inserted in the opening of the latter.

4. A cut-out valve comprising a pipe having an opening therein, an elbow having an opening at one end within which is a valve seat through which the bore of said elbow communicates with the bore of said pipe, flanges projecting laterally and horizontally from the lower edges of said elbow, there being downwardly extending beads from the lower surfaces of said flanges adjacent the elbow opening, a flexible plate of sheet metal having an opening therein the longitudinal edges of which are flanged outwardly and laterally and secured to the under surface of said elbow flanges with the angle in the plate flanges seated contiguous to said beads, a valve having its rear end bent transversely and pivotally mounted at the rear end of said valve seat, the fulcrum of said valve being wholly above the flanges of both the elbow and the plate, and means for securing said plate to said pipe.

5. The method of accurately mounting a valve upon its seat in the bore of a tube for rocking movement upon an axis offset from said seat, comprising mounting a longitudinally slotted rock shaft with its ends extending through the walls of said tube and its axis in a transverse plane higher than said valve seat, positioning a flat valve tongue upon said seat and with its rear end bent therefrom and loosely inserted in said slot, at the same time accommodating the position of said bent portion to the relative positions of the seat and shaft, and then welding said bent end in said slot in situ.

6. The method of accurately mounting a flat valve tongue in position upon its valve seat for rocking movement for opening and closing the valve, comprising mounting a longitudinally slotted rock shaft in bearings to the rear of said valve seat and transverse of the plane of said tongue, positioning said valve tongue over its seat and inserting its rear end loosely in said slot, accommodating the position of said rear end in the slot to the relative position of the valve seat and shaft, and welding said rear end in said slot in situ.

In testimony whereof I hereunto affix my signature.

ASA E. LINENDOLL.